US012667872B1

(12) United States Patent
Zaman et al.

(10) Patent No.: US 12,667,872 B1
(45) Date of Patent: Jun. 30, 2026

(54) SYSTEM AND METHOD OF WASTE MANAGEMENT

(71) Applicant: King Fahd University of Petroleum and Minerals, Dhahran (SA)

(72) Inventors: Sk Arafat Zaman, Al Khobar (SA); Fahad Mohammed Alzahrani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/361,624

(22) Filed: Oct. 17, 2025

(30) Foreign Application Priority Data

Oct. 12, 2025 (SA) ................................. 1020257554

(51) Int. Cl.
*B09B 3/70* (2022.01)
*B09B 3/45* (2022.01)

(52) U.S. Cl.
CPC . *B09B 3/45* (2022.01); *B09B 3/70* (2022.01)

(58) Field of Classification Search
CPC .................................. B09B 3/45; B09B 3/70
USPC ...................................................... 422/184.1
See application file for complete search history.

(56) References Cited

U.S. PATENT DOCUMENTS

2024/0092714 A1    3/2024 Lourenco et al.

FOREIGN PATENT DOCUMENTS

| | | | |
|---|---|---|---|
| CN | 114300707 A | | 4/2022 |
| CN | 216213576 U | * | 4/2022 |
| CN | 117352791 A | | 1/2024 |
| EP | 3 054 519 A1 | | 8/2016 |

OTHER PUBLICATIONS

CN-216213576 U—machine translation (Year: 2026).*
Dibyendu Roy, et al., "Fuel cell integrated carbon negative power generation from biomass", Applied Energy, vol. 331, Dec. 5, 2022, 120449, 17 pages.

* cited by examiner

*Primary Examiner* — Huy Tram Nguyen
(74) *Attorney, Agent, or Firm* — Oblon, McClelland, Maier & Neustadt, L.L.P.

(57) ABSTRACT

A system of waste management includes a steam gasification unit to convert municipal solid waste to a syngas. A molten carbonate fuel cell (MCFC) unit receives the syngas at an anode and an industrial exhaust gas at a cathode to generate electrical energy and separate a first carbon dioxide gas. An oxygen combustion unit receives remaining syngas from the anode and combusts the remaining syngas with oxygen to generate a heated gas stream. A steam Rankine cycle unit captures a first thermal energy from the heated gas stream. A carbon capture unit separates water and a second carbon dioxide gas from a resulting cooled gas stream. An electrolysis unit uses the electrical energy from the MCFC unit to split water into the oxygen gas for the oxygen combustion unit and a second hydrogen gas for the anode.

20 Claims, 8 Drawing Sheets

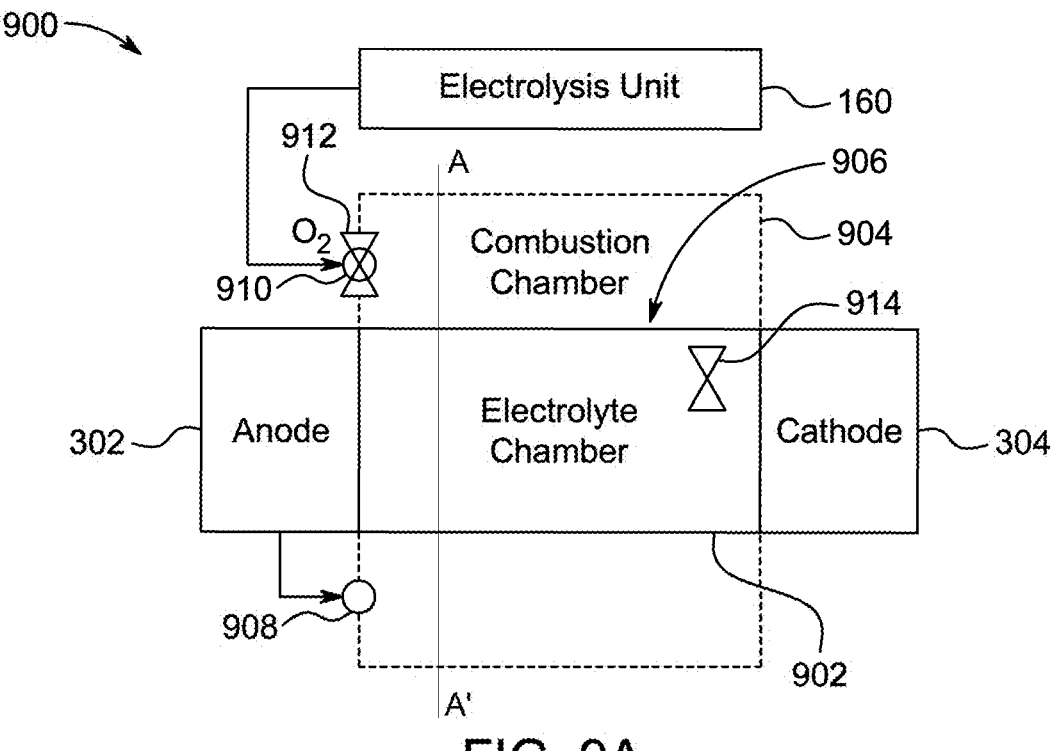
FIG. 9A
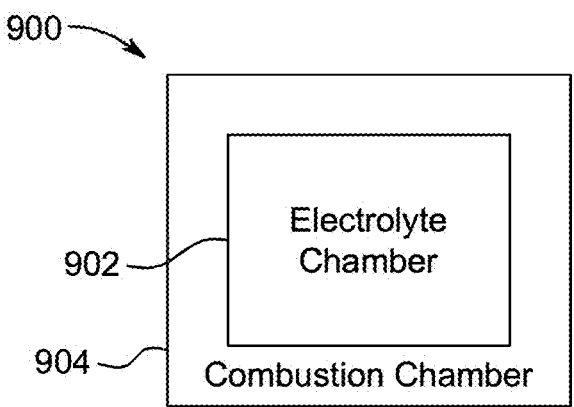
FIG. 9B
Inputting the municipal solid waste, the palm waste and the industrial exhaust gas into the system
FIG. 10

SYSTEM AND METHOD OF WASTE MANAGEMENT

CROSS-REFERENCE TO RELATED APPLICATION

The present disclosure claims the benefit of Saudi Patent Application No. 1020257554, filed on Oct. 12, 2025, with the Saudi Authority for Intellectual Property Office, which is incorporated herein by reference in its entirety.

BACKGROUND

Technical Field

The present disclosure is directed to waste management systems and energy generation. More particularly, the present disclosure pertains to systems and methods for converting municipal solid waste and biomass waste into energy and fuel while capturing carbon dioxide to achieve carbon negative operations.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Municipal solid waste generation continues to increase globally due to rapid urbanization, economic development, and population growth. According to waste management authorities, significant quantities of waste are generated annually, with disposal traditionally handled through land-filling practices. The majority of waste disposal facilities are approaching capacity limits, creating environmental and economic challenges. Current land-filling practices result in leachate contamination and greenhouse gas emissions that affect surrounding land, water, and air quality. On the other hand, energy demand is predominantly met by fossil fuels, with a major portion of carbon dioxide emissions released through the usage of fossil fuels in power plants, manufacturing industries, and transportation sectors. Municipal solid waste disposal through land-filling or open combustion produces similar environmental impacts. The concept of waste to energy has gained attention as it provides dual benefits of effective waste management while meeting increasing power requirements of modern society.

Many studies have explored combustion-based energy harvesting from municipal solid waste. However, massive localized air pollution due to combustion of municipal solid waste creates significant environmental concerns. Gasification of municipal solid waste and other waste biomass has gained popularity over other waste management techniques due to flexibility of usage of syngas produced from gasification processes. Compared to direct combustion-based systems, syngas-driven systems require comparatively simpler combustion chamber setups as they are not susceptible to the same problems including clogging, slagging, and corrosion of combustion chambers as are often faced by direct combustion systems.

CN117352791A discloses a clean coal-electricity poly-generation system including a reforming subsystem fed with methane to produce hydrogen-rich gas, a fuel cell subsystem for the hydrogen-rich gas to undergo an electrochemical reaction with air to generate electrical energy, an afterburner, a supercritical carbon dioxide circulation subsystem for performing heat exchange treatment to generate electrical energy and thermal energy, and an organic Rankine cycle subsystem for heating air entering the cathode of the fuel cell subsystem and generating electrical energy.

EP3054519A1 discloses a fuel cell system including a molten carbonate fuel cell. The fuel supplied to the molten carbonate fuel cell may be produced by different processes including gasification of solid and liquid compounds, or recovery of combustible gases from sewage plants, fermentation processes, mine gas or waste recycling processes. Waste heat can be used in an organic Rankine cycle. Reactant products including carbon dioxide, water and remaining synthesis gas exit the molten carbonate fuel cell and are supplied to an afterburner for combustion. Products of the afterburner can pass through a gas turbine to produce electric energy for electrolysis.

CN114300707A discloses a multi-generation system based on biomass gasification and solid oxide fuel cells, including two parts: top and bottom circulation systems. The top system includes a biomass gasification system coupled to a solid oxide fuel cell system. The bottom system includes a carbon dioxide capture system and a supercritical carbon dioxide recompression power circulation system that directly recovers the cathode and anode flue gas waste heat of the solid oxide fuel cell system.

US20240092714A1 discloses a method of producing petrochemicals using a hydrocarbon fuel cell. A dry methane reforming process in the fuel cell converts natural gas and carbon dioxide into a syngas product of carbon monoxide and hydrogen.

Roy et al., in "Fuel cell integrated carbon negative power generation from biomass," describe a system for carbon-negative power generation from biomass. The system is described as including a gasifier, a solid oxide fuel cell (SOFC) unit, a molten carbonate fuel cell (MCFC)-based $CO_2$ separation unit, and an organic Rankine cycle for the purpose of waste heat recovery. However, this reference does not describe a fully integrated carbon-negative system that utilizes waste feedstock and recycles internally generated process streams such as water and oxygen in a closed-loop configuration.

Each of the aforementioned approaches suffers from one or more drawbacks hindering their practical implementation for achieving carbon negative waste management operations. For example, none of these approaches describes a fully integrated carbon-negative system that utilizes waste feedstock and recycles internally generated process streams such as water and oxygen in a closed-loop configuration. Existing systems fail to provide integrated solutions that simultaneously process municipal solid waste, capture carbon dioxide from external industrial sources, and produce both energy and clean fuel in a carbon negative manner. Existing waste-to-energy systems typically focus on a single product output and do not incorporate comprehensive carbon capture strategies that result in net negative carbon emissions. Additionally, conventional systems require external water inputs and do not use closed loop operations for enhanced efficiency.

Accordingly, it is one object of the present disclosure to provide a system and a method for waste management that converts municipal solid waste and Palm waste into multiple useful products while achieving carbon negative operations through integrated carbon dioxide capture from external industrial sources.

SUMMARY

In an aspect, a system of waste management includes a steam gasification unit configured to convert municipal solid waste and Palm waste to a syngas including a first hydrogen gas, a molten carbonate fuel cell unit including an anode configured to receive the syngas from the steam gasification unit and a cathode configured to receive an industrial exhaust gas including a first carbon dioxide gas such that the molten carbonate fuel cell unit generates an electrical energy and separates at least a portion of the first carbon dioxide gas from the industrial exhaust gas, an oxygen combustion unit configured to receive a remaining portion of the syngas from the anode of the molten carbonate fuel cell unit and combust the remaining portion of the syngas to generate a heated gas stream including water vapors and a second carbon dioxide gas, a steam Rankine cycle unit configured to receive the heated gas stream from the oxygen combustion unit and capture a first thermal energy from the heated gas stream to generate a cooled gas stream, a carbon capture unit configured to separate the water vapors and separate the second carbon dioxide gas from the cooled gas stream, and an electrolysis unit configured to split water into an oxygen gas and a second hydrogen gas using the electrical energy from the molten carbonate fuel cell unit, wherein the oxygen combustion unit is configured to receive the oxygen gas from the electrolysis unit, and the anode of the molten carbonate fuel cell unit is configured to receive the second hydrogen gas from the electrolysis unit.

In some embodiments, the system includes a closed aqueous loop in which no external water is used other than internal water generated within the closed aqueous loop, and the closed aqueous loop includes the steam gasification unit, the molten carbonate fuel cell unit, the oxygen combustion unit, the steam Rankine cycle unit and the carbon capture unit.

In some embodiments, the steam Rankine cycle unit is configured to receive the water vapors from the carbon capture unit to produce a steam, and the steam gasification unit is configured to receive the steam from the steam Rankine cycle unit to produce the syngas.

In some embodiments, the steam Rankine cycle unit includes one or more heat exchangers configured to receive the water vapors from the carbon capture unit and receive the heated gas stream for heat exchange to produce heated water vapors, and a turbine configured to receive the heated water vapors to generate energy and produce the steam.

In some embodiments, $H_2O$ is generated by the MCFC unit and the oxygen combustion unit in the closed aqueous loop.

In some embodiments, $H_2O$ is consumed by the steam gasification unit.

In some embodiments, the system includes a closed aqueous loop in which no external water is used other than internal water generated within the closed aqueous loop, and the closed aqueous loop includes the molten carbonate fuel cell unit and the electrolysis unit.

In some embodiments, the electrolysis unit is configured to receive the water from the molten carbonate fuel cell unit and fresh/external water and external power supply along with the internal water utilization. The need for external power is met by the excess electricity produced by the MCFC unit. Water from MCFC and oxy-combustion through CCU can be used in the steam Rankine cycle.

In some embodiments, the molten carbonate fuel cell unit and the oxygen combustion unit form one integral structure that includes the anode, the cathode, an electrolyte chamber and a combustion chamber, and the electrolyte chamber and the combustion chamber share a common wall structure that physically separates the electrolyte chamber from the combustion chamber.

In some embodiments, an outlet of the anode is connected to a first inlet of the combustion chamber, and the first inlet of the combustion chamber is configured to receive the remaining portion of the syngas from the anode and combust the remaining portion of the syngas in the combustion chamber.

In some embodiments, the common wall structure is configured for heat exchange between the electrolyte chamber and the combustion chamber.

In some embodiments, the combustion chamber further includes a second inlet configured to receive the oxygen gas from the electrolysis unit and a gas valve configured to adjust a flow rate of the oxygen gas, and the electrolyte chamber further includes a temperature sensor configured to adjust the gas valve based on a temperature of the electrolyte chamber.

In some embodiments, the electrolyte chamber is surrounded by the combustion chamber by 360 degrees.

In some embodiments, the electrolyte chamber is positioned between the anode and the cathode.

In some embodiments, the system further includes a supercritical carbon dioxide unit configured to receive the second carbon dioxide gas to form a working fluid to capture a second thermal energy from the cathode of the molten carbonate fuel cell unit.

In some embodiments, the system further includes a boiler configured to receive the first thermal energy to generate a steam for the steam gasification unit.

In some embodiments, the carbon capture unit is configured to separate the second carbon dioxide gas by multistage compression and cooling.

In some embodiments, the syngas further includes carbon monoxide, methane and carbon dioxide.

In some embodiments, the syngas includes no nitrogen gas.

In another aspect, a method of waste management includes inputting the municipal solid waste, the Palm waste and the industrial exhaust gas into the system of waste management.

In some embodiments, the inputting generates the electrical energy.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

FIG. 9A is a schematic diagram of an integral structure combining a molten carbonate fuel cell unit and an oxygen combustion unit for the system of waste management, according to certain embodiments.

FIG. 9B is a cross-sectional view of the integral structure of FIG. 9A taken along the line cut AA', according to certain embodiments.

FIG. 10 is a flowchart of a method of waste management using the system of FIG. 1, according to certain embodiments.

DETAILED DESCRIPTION

Figure 1:
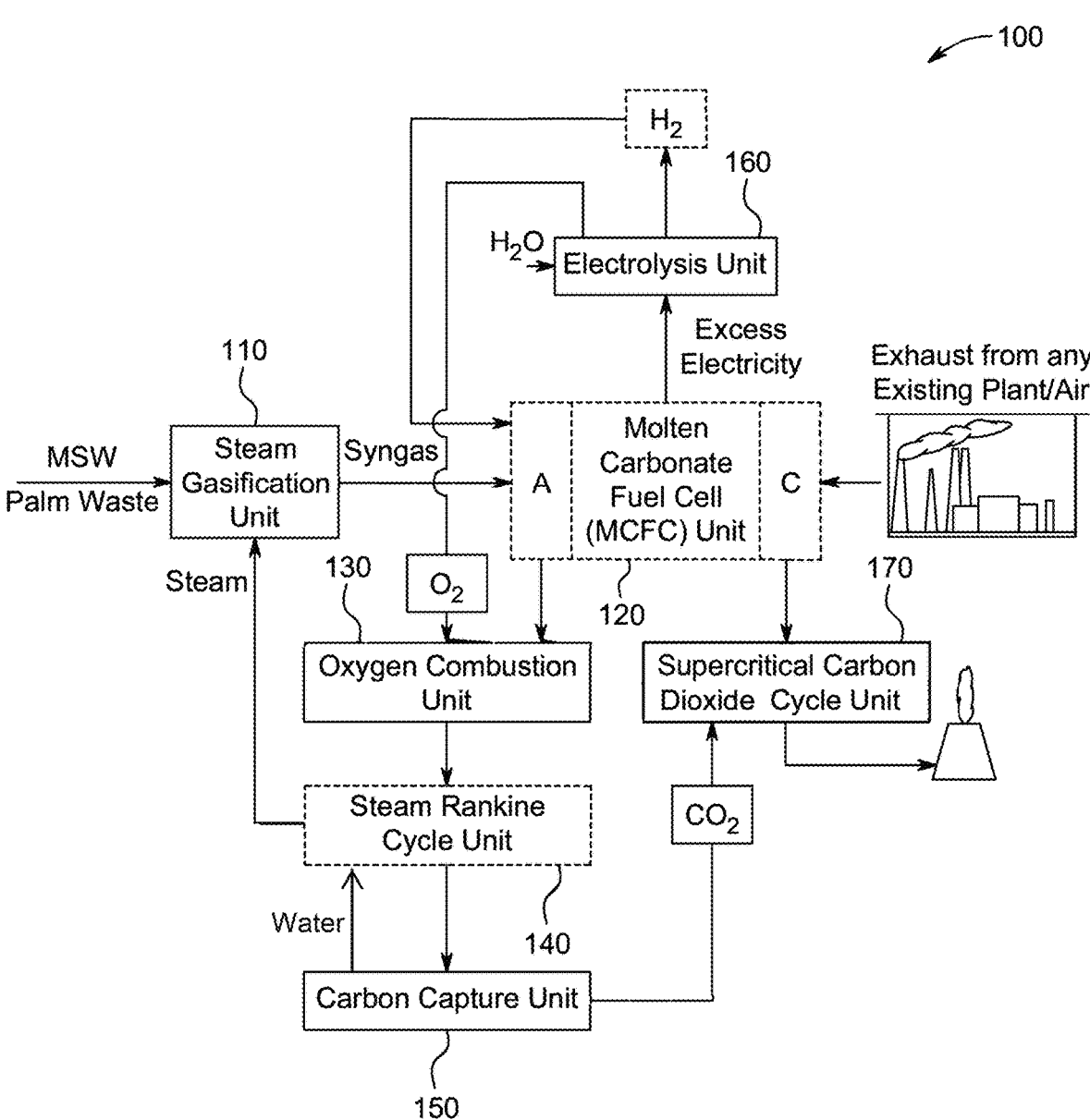
FIG. 1 is a schematic diagram of a system of waste management, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method for waste management that converts municipal solid waste and biomass into electrical energy and hydrogen gas while capturing carbon dioxide. The system is configured to convert waste streams, such as municipal industrial exhaust, into electrical energy and hydrogen gas. The system integrates multiple technologies, including steam gasification, fuel cell power generation, oxygen combustion, electrolysis, carbon capture, and multiple heat recovery cycles to achieve carbon-negative operation and high overall efficiency.

Referring to FIG. 1, illustrated is a schematic diagram of a system of waste management (as represented by reference numeral 100, and hereinafter referred to as a "system 100"), as per embodiments of the present disclosure. The system 100 enables efficient utilization of waste materials that would otherwise be disposed of in landfills or through other environmentally harmful methods. The system 100 addresses the dual challenges of waste management and energy production by converting municipal solid waste and Palm waste biomass into valuable products. The system 100 facilitates the conversion of solid waste into a syngas, which is then used to generate electrical energy while separating carbon dioxide from an industrial exhaust gas. The system 100 is further configured to use byproducts from one stage as inputs for another, such as using generated electricity for electrolysis and using the resulting oxygen and hydrogen within the process, creating a highly integrated and resource-efficient platform applicable to industrial and municipal waste management.

The system 100 integrates multiple advanced technologies to maximize energy recovery and minimize environmental impact. The system 100 includes a multi-component configuration designed for the integrated processing of waste materials. As illustrated in FIG. 1, the system 100 includes a steam gasification unit 110, a molten carbonate fuel cell (MCFC) unit 120, an oxygen combustion unit 130, a steam Rankine cycle unit 140, a carbon capture unit 150, and an electrolysis unit 160. In some examples, the system 100 further includes a supercritical carbon dioxide unit 170. The system 100 combines the steam gasification unit 110, the MCFC unit 120, the oxygen combustion unit 130, the steam Rankine cycle unit 140, the carbon capture unit 150, and the electrolysis unit 160 into a synergistic process, that generates electrical energy and hydrogen fuel, and achieves carbon negative operations through strategic integration of various processing units.

Figure 2:
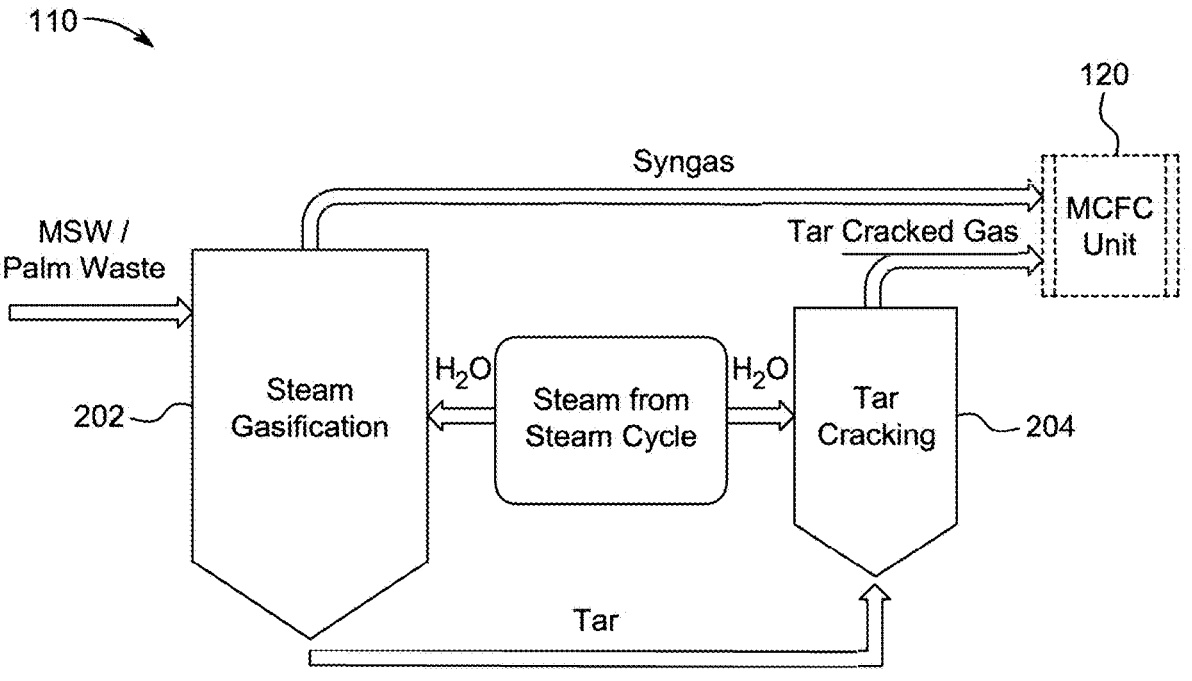
FIG. 2 is a detailed schematic diagram of a steam gasification unit of the system of FIG. 1, according to certain embodiments.

Referring now to FIG. 2, the steam gasification unit 110 is illustrated in greater detail. The steam gasification unit 110 is configured to convert municipal solid waste and Palm waste to a syngas including a first hydrogen gas. The steam gasification unit 110 receives municipal solid waste (MSW) and Palm waste as input feedstock and subjects these materials to high temperature steam gasification processes. The steam gasification unit 110 operates by introducing steam at elevated temperatures to decompose the organic components of the waste materials into gaseous products. The steam gasification unit 110 produces syngas that includes a first hydrogen gas along with other gaseous components. In some embodiments, the syngas further includes carbon monoxide, methane and carbon dioxide. Furthermore, the syngas may include no nitrogen gas, as the use of steam as the gasifying agent rather than air eliminates nitrogen introduction during gasification. The steam gasification unit 110 provides a clean conversion process that avoids the formation of harmful emissions typically associated with direct combustion of waste materials.

The syngas including the first hydrogen gas produced by the steam gasification unit 110 represents a clean fuel source that can be utilized for energy generation applications. The syngas contains the first hydrogen gas that serves as a fuel component for subsequent energy conversion processes within the system 100. The first hydrogen gas within the syngas provides high energy content and clean burning characteristics that enable efficient power generation. The syngas including the first hydrogen gas also provides flexibility in utilization as it can be directed to various components of the system 100 for different energy conversion processes. The composition of the syngas provides desirable performance in fuel cell applications while maintaining compatibility with other energy conversion technologies.

As illustrated in FIG. 2, herein, the steam gasification unit 110 includes a steam gasification section 202 that receives the waste materials and subjects them to high temperature steam treatment. The steam gasification unit 110 also incorporates a tar cracking section 204 that processes tar compounds produced during the gasification process to ensure a clean syngas output. The steam gasification unit 110 can receive steam from other components of the system 100 to maintain the gasification process without requiring external steam inputs. For example, the steam gasification unit 110 can receive a steam from the carbon capture unit 150, as will be explained in detail later. In present configurations, the steam gasification unit 110 operates at temperatures that ensure complete conversion of organic waste materials into gaseous products. As shown, the steam gasification unit 110 produces syngas that is directed to the MCFC unit 120 for energy conversion applications.

Figure 3:
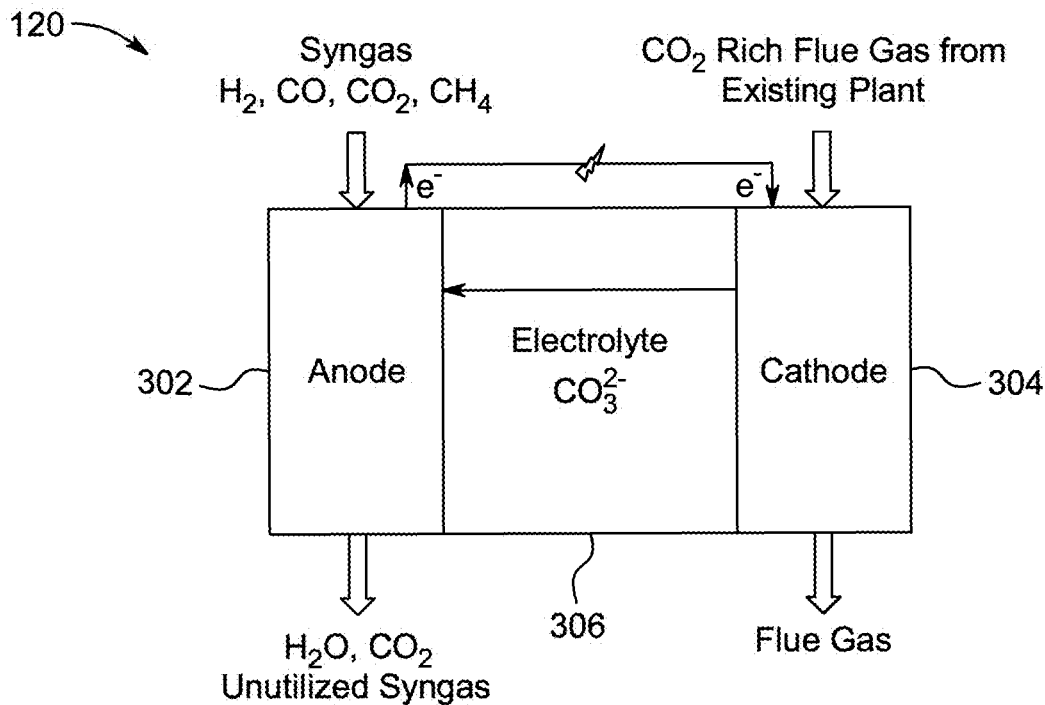
FIG. 3 is a detailed schematic diagram of a molten carbonate fuel cell unit of the system of FIG. 1, according to certain embodiments.

Referring now to FIG. 3, the MCFC unit 120 includes an anode 302 configured to receive the syngas from the steam gasification unit 110 and a cathode 304 configured to receive an industrial exhaust gas including a first carbon dioxide gas such that the MCFC unit 120 generates an electrical energy and separates at least a portion of the first carbon dioxide gas from the industrial exhaust gas. The MCFC unit 120 serves multiple functions within the system 100 including electrical energy generation and carbon dioxide separation from external industrial sources. The MCFC unit 120 operates at elevated temperatures that enable efficient electrochemical conversion of the syngas into electrical energy. The MCFC unit 120 processes the industrial exhaust gas at the cathode 304 to capture carbon dioxide and prevent its release to the atmosphere. The MCFC unit 120 contributes to the carbon negative operation of the system 100 by removing carbon dioxide from external sources while generating useful electrical energy. The MCFC unit 120 further integrates waste conversion with industrial decarbonization to provide comprehensive environmental benefits.

Herein, the anode 302 configured to receive the syngas from the steam gasification unit 110 provides the fuel input interface for the MCFC unit 120. The anode 302 receives the syngas including the first hydrogen gas and facilitates electrochemical reactions that convert the hydrogen content into electrical energy. The anode 302 operates at temperatures and conditions suitable for molten carbonate fuel cell electrochemical processes. The anode 302 enables efficient utilization of the syngas produced from waste materials while maintaining stable fuel cell operation.

Further, the cathode 304 configured to receive an industrial exhaust gas including a first carbon dioxide gas enables the MCFC unit 120 to process external carbon dioxide sources. The cathode 304 receives the industrial exhaust gas from existing industrial facilities or power plants that contain carbon dioxide emissions. The cathode 304 facilitates electrochemical reactions that separate at least a portion of the first carbon dioxide gas from the industrial exhaust gas.

In the system 100, the MCFC unit 120 generates an electrical energy through electrochemical conversion of the syngas received at the anode 302. The MCFC unit 120 operates at elevated temperatures that facilitate efficient electrochemical reactions between the syngas and the electrolyte medium. The electrical energy generated by the MCFC unit 120 provides a power output of the system 100 that can be utilized for various applications. The MCFC unit 120 achieves high efficiency electrical energy conversion due to the direct electrochemical process that avoids combustion inefficiencies. The electrical energy production by the MCFC unit 120 occurs in conjunction with carbon dioxide separation, enabling dual functionality within a single unit. It may be appreciated that the MCFC unit 120 produces electrical energy in a clean manner without generating harmful emissions or byproducts.

Furthermore, the MCFC unit 120 separates at least a portion of the first carbon dioxide gas from the industrial exhaust gas received at the cathode 304. The separation process occurs through electrochemical reactions that selectively remove carbon dioxide from the industrial exhaust gas stream. The MCFC unit 120 captures at least a portion of the first carbon dioxide gas and prevents its release to the atmosphere, contributing to the carbon negative operation of the system 100. The separation efficiency of the MCFC unit 120 enables significant reduction in carbon dioxide emissions from external industrial sources.

Continuing with reference to FIG. 3, the MCFC unit 120 is illustrated showing the electrochemical operation with syngas input at the anode 302 and industrial exhaust gas input at the cathode 304. The MCFC unit 120 includes an electrolyte chamber 306 containing molten carbonate electrolyte that facilitates ion transport between the anode 302 and cathode 304. The MCFC unit 120 operates at temperatures in the range of 600 to 700 degrees Celsius to maintain the electrolyte in a molten state and enable efficient electrochemical reactions. The MCFC unit 120 produces electrical energy through the electrochemical conversion of hydrogen of the syngas. The MCFC unit 120 processes carbon dioxide from the industrial exhaust gas and incorporates it into the electrochemical reactions. A remaining portion of the syngas exits the MCFC unit 120 at the anode outlet that contains remaining fuel components for further processing.

Figure 4:
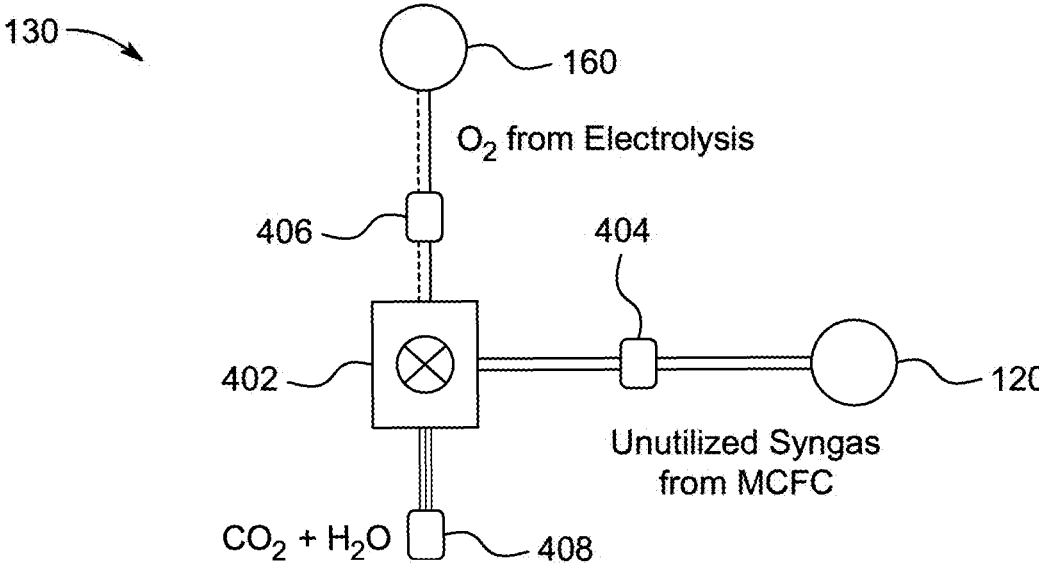
FIG. 4 is a detailed schematic diagram of an oxygen combustion unit of the system of FIG. 1, according to certain embodiments.

Referring now to FIG. 4, the oxygen combustion unit 130 (sometimes referred to as "Oxy-combustion" in accompanied drawings) is configured to receive the remaining portion of the syngas (also noted as "Unutilized Syngas from MCFC" in FIG. 4) from the anode 302 of the MCFC unit 120 and combust the remaining portion of the syngas to generate a heated gas stream including water vapors and a second carbon dioxide gas. In some embodiments, the oxygen combustion unit 130 uses pure oxygen rather than air to ensure clean combustion without nitrogen introduction. The oxygen combustion unit 130 generates a heated gas stream that contains only water vapors and carbon dioxide as combustion products due to the pure oxygen combustion process. The heated gas stream produced by the oxygen combustion unit 130 provides thermal energy that can be captured for additional power generation within the system 100. Thus, the oxygen combustion unit 130 helps eliminate waste of unused fuel components while contributing to the overall energy output of the system 100.

The remaining portion of the syngas received by the oxygen combustion unit 130 includes fuel components that were not consumed in the electrochemical reactions of the MCFC unit 120. The remaining portion of the syngas contains hydrogen, carbon monoxide, methane, and other combustible components that may retain significant energy content. The oxygen combustion unit 130 combusts the remaining portion of the syngas to extract at least a portion of and preferably the entirety of the residual energy value and prevent waste of fuel components. Such utilization of the remaining portion of the syngas provides additional energy recovery beyond the electrical energy generated by the MCFC unit 120, and thus contributes to the high overall efficiency of the system 100.

Herein, the heated gas stream including water vapors and a second carbon dioxide gas generated by the oxygen combustion unit 130 includes the combustion products of the remaining syngas. The heated gas stream contains thermal energy that can be recovered for additional power generation or heating applications within the system 100. The water vapors in the heated gas stream can be reused in other processes of the system 100. The second carbon dioxide gas in the heated gas stream can be separated and captured to prevent atmospheric release and contribute to carbon negative operations. In addition, the heated gas stream provides a high temperature energy source that enables efficient thermal energy recovery through subsequent processing units. The composition of the heated gas stream facilitates easy separation of water vapors and carbon dioxide due to the pure oxygen combustion process.

As illustrated in FIG. 4, the oxygen combustion unit 130 includes a combustion chamber 402 that receives the remaining syngas and pure oxygen for controlled combustion reactions. The combustion chamber 402 is configured with a first inlet 404 for receiving the unutilized syngas from the MCFC unit 120 and a second inlet 406 for receiving the oxygen gas from the electrolysis unit 160. An outlet 408 of the combustion chamber 402 is configured to discharge the aforementioned heated gas stream, which includes carbon dioxide and water. The heated gas stream may contain only water vapors and carbon dioxide without nitrogen or other contaminants. The oxygen combustion unit 130 provides efficient heat recovery from the combustion process while maintaining clean emissions. The oxygen combustion unit 130 integrates with other components of the system 100 to enable continuous processing of the remaining syngas.

Figure 5:
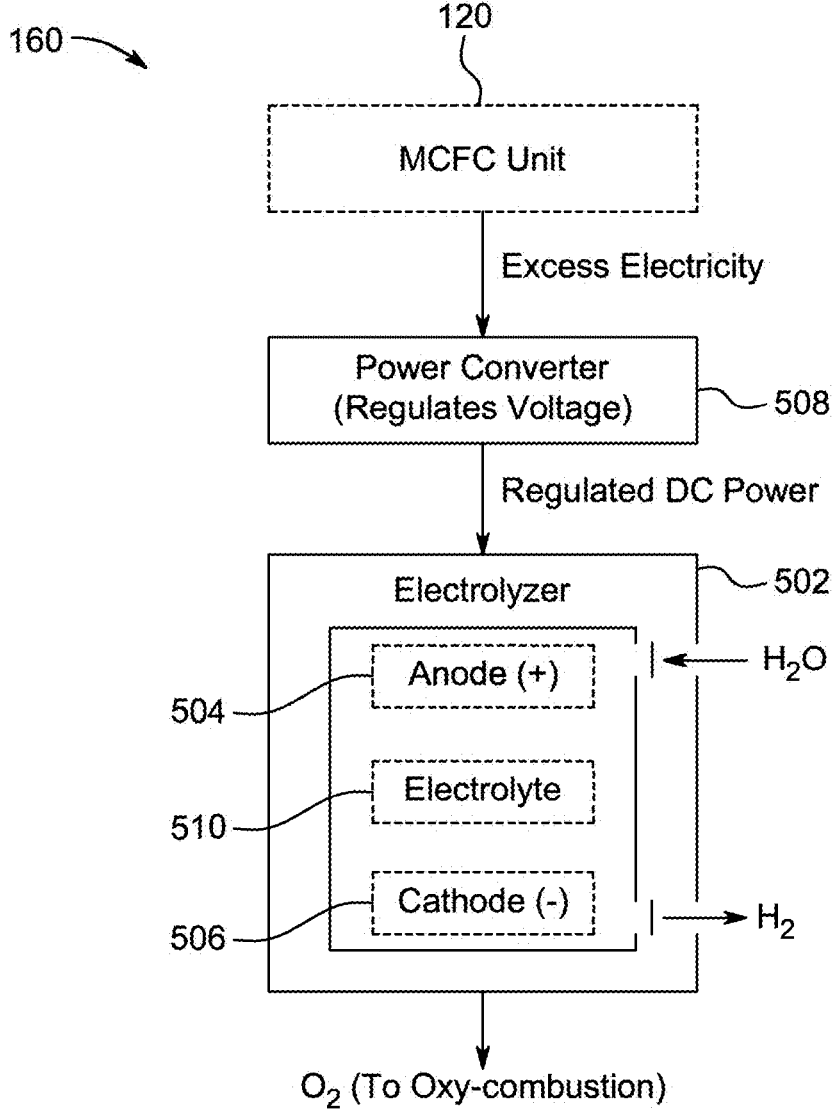
FIG. 5 is a detailed schematic diagram of an electrolysis unit of the system of FIG. 1, according to certain embodiments.

Referring now to FIG. 5, the electrolysis unit 160 is configured to split water into an oxygen gas and a second hydrogen gas using the electrical energy from the MCFC unit 120. The electrolysis unit 160 can utilize the electrical energy generated by the MCFC unit 120 to perform water splitting reactions that produce hydrogen and oxygen gases. The electrolysis unit 160 operates through electrochemical processes that decompose water molecules into constituent hydrogen and oxygen atoms. The electrolysis unit 160 generates an oxygen gas that can be utilized for combustion processes within the system 100, eliminating the need for external oxygen sources. Herein, the electrolysis unit 160 produces a second hydrogen gas that can be utilized as a clean fuel product or recycled back to the MCFC unit 120. In general, the electrolysis unit 160 contributes to the multi-product nature of the system 100 by generating hydrogen fuel as an additional output product.

The water split by the electrolysis unit 160 into an oxygen gas and a second hydrogen gas comes from water recovered within the system 100 or from water generated by various processes along with the fresh water supply. The electrolysis unit 160 performs water splitting through electrical energy input that overcomes the molecular bonds between hydrogen and oxygen atoms in water molecules. The water utilized by the electrolysis unit 160 can be sourced from the carbon capture unit 150, the steam Rankine cycle unit 140, the MCFC unit 120 or other water recovery processes within the system 100 (as shown in FIG. 1) or any combinations thereof. The water splitting process generates pure hydrogen and oxygen gases without harmful byproducts or emissions. Consequently, the electrolysis unit 160 enables the system 100 to produce clean hydrogen fuel while generating oxygen for internal combustion processes.

The oxygen gas produced by the electrolysis unit 160 serves as the oxidizer for the oxygen combustion unit 130, creating an integrated oxygen supply loop within the system 100. The oxygen combustion unit 130 is configured to receive the oxygen gas from the electrolysis unit 160. The oxygen gas generated through water splitting provides a pure oxidizer source that eliminates the need for air separation equipment or external oxygen supplies. The oxygen combustion unit 130 utilizes the oxygen gas from the electrolysis unit 160 to combust the remaining portion of the syngas from the MCFC unit 120 in a controlled manner. The oxygen supply from the electrolysis unit 160 to the oxygen combustion unit 130 maintains the purity of combustion products and enables efficient carbon dioxide separation. Furthermore, as shown in FIG. 1, the anode (noted as "A") of the MCFC unit 120 is configured to receive the second hydrogen gas from the electrolysis unit 160, creating an integrated hydrogen circulation loop. The anode receives the second hydrogen gas from the electrolysis unit 160 to supplement the hydrogen content of the syngas from the steam gasification unit 110. The integrated hydrogen supply enables the system 100 to improve electrical energy generation while producing additional hydrogen as a product output.

In particular, as illustrated in FIG. 5, the electrolysis unit 160 includes an electrolyzer 502 with an anode 504 and a cathode 506 that facilitate the water splitting reaction. The electrolysis unit 160 incorporates a power converter 508 that regulates the electrical energy input from the MCFC unit 120 to regulate conditions for electrolysis. The electrolysis unit 160 also includes an electrolyte medium 510 that enables ion transport between the electrodes during the water splitting process. The electrolysis unit 160 produces hydrogen gas at the cathode 506 and oxygen gas at the anode 504 through the electrochemical decomposition of water. The electrolysis unit 160 operates with water inputs that can be sourced from various components of the system 100 to maintain continuous hydrogen and oxygen production.

Figure 6:
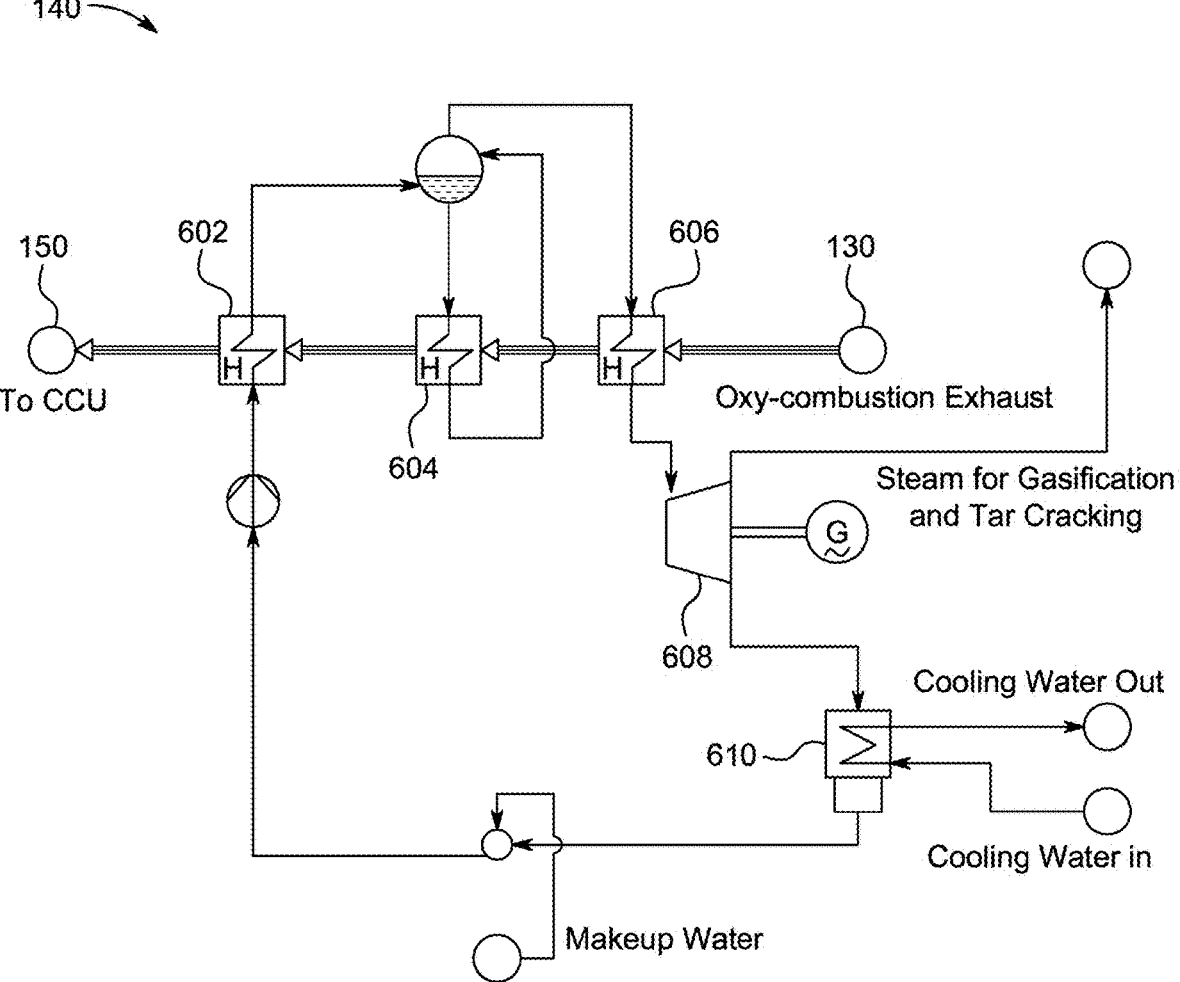
FIG. 6 is a detailed schematic diagram of a steam Rankine cycle unit of the system of FIG. 1, according to certain embodiments.

Referring now to FIG. 6, the steam Rankine cycle unit 140 is configured to receive the heated gas stream from the oxygen combustion unit 130 and capture a first thermal energy from the heated gas stream to generate a cooled gas stream. Herein, the steam Rankine cycle unit 140 provides thermal energy recovery from the heated gas stream to generate additional electrical power or mechanical energy. The steam Rankine cycle unit 140 operates using steam cycle principles with a steam cycle working fluid such as water to extract thermal energy from the heated gas stream. The steam Rankine cycle unit 140 captures the first thermal energy through heat exchange processes that transfer heat from the heated gas stream to the steam cycle working fluid. The steam Rankine cycle unit 140 generates a cooled gas stream by removing thermal energy from the heated gas stream through the heat exchange process. Thereby, the steam Rankine cycle unit 140 contributes to the overall energy output of the system 100 by recovering thermal energy that would otherwise be wasted.

Specifically, the cooled gas stream generated by the steam Rankine cycle unit 140 results from the thermal energy extraction process applied to the heated gas stream. The cooled gas stream retains the same chemical composition as the heated gas stream but at a reduced temperature due to thermal energy removal. The cooled gas stream contains water vapors and second carbon dioxide gas at conditions suitable for further processing and separation. The steam Rankine cycle unit 140 produces the cooled gas stream at temperatures and pressures that facilitate efficient downstream processing. The cooled gas stream enables subsequent separation of water vapors and carbon dioxide through the carbon capture unit 150.

In particular, as illustrated in FIG. 6, the steam Rankine cycle unit 140 includes an economizer 602, an evaporator 604, and a superheater 606 that facilitate heat transfer from the heated gas stream to the steam cycle working fluid. The steam Rankine cycle unit 140 further incorporates a turbine 608 that converts thermal energy into mechanical energy through steam expansion. The steam Rankine cycle unit 140 further includes a condenser 610 that condenses the steam cycle working fluid. While shown to have cooling water in and out, it should be understood that any working fluid such as glycols (e.g. ethylene and propylene), oils (e.g. mineral and silicone), and alcohols (e.g. ethanol) can be used instead of water. In addition, the steam Rankine cycle unit 140 operates with makeup water inputs and steam outputs that integrate with other 150.components of the system 100. As will be explained later, the makeup water can be supplied by the carbon capture unit 150.

Figure 7:
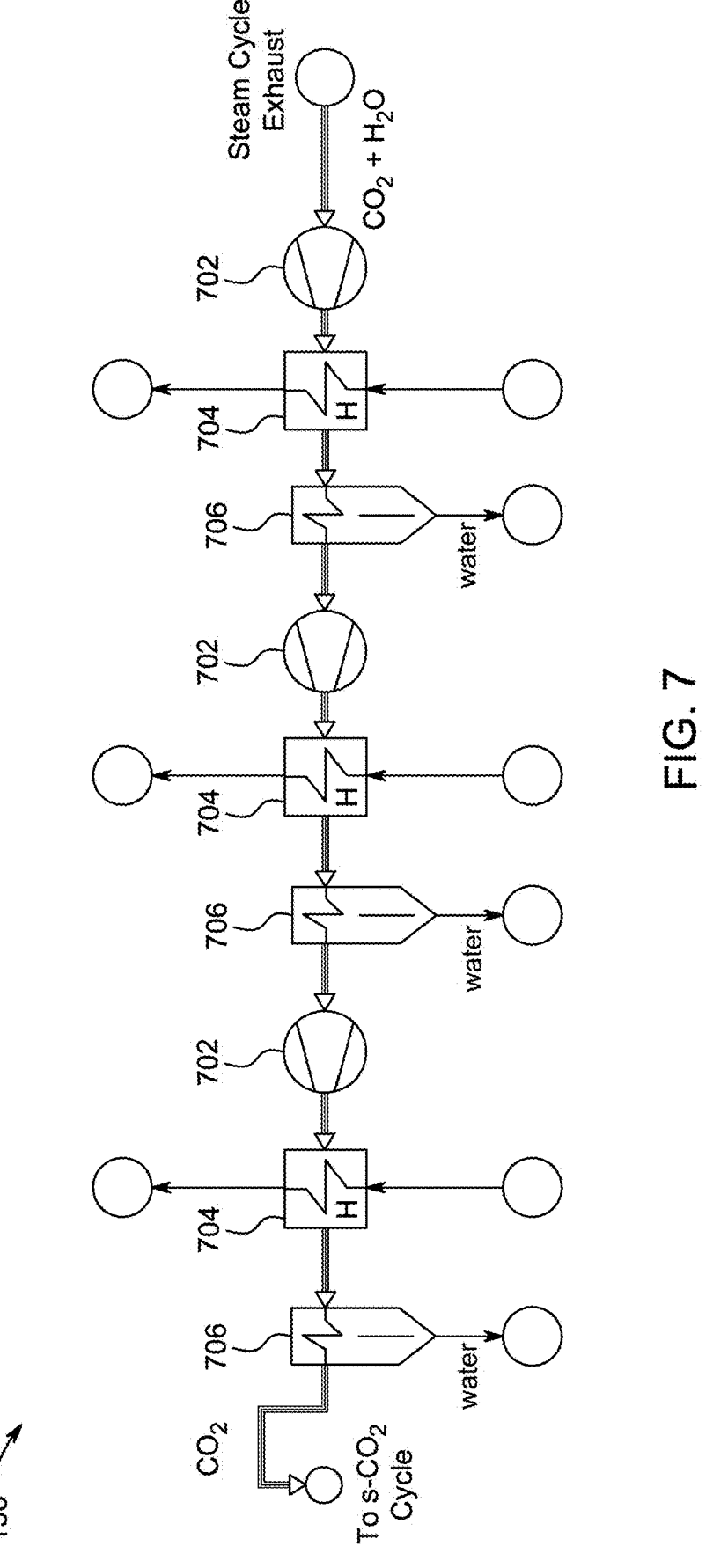
FIG. 7 is a detailed schematic diagram of a carbon capture unit of the system of FIG. 1, according to certain embodiments.

Following the steam Rankine cycle unit 140, as discussed, the system 100 further includes the carbon capture unit 150 (as illustrated in detail in FIG. 7). The carbon capture unit 150 (sometimes referred to as CCU in accompanied drawings) is configured to separate the water vapors and separate the second carbon dioxide gas from the cooled gas stream. The carbon capture unit 150 processes the cooled gas stream from the steam Rankine cycle unit 140 to isolate the different gas components for reuse or disposal. The carbon capture unit 150 separates the water vapors through condensation processes that convert the water vapors back to liquid water for reuse within the system 100. The carbon capture unit 150 separates the second carbon dioxide gas through compression and cooling processes that isolate the carbon dioxide for capture and utilization. The carbon capture unit 150 enables at least partial recovery and preferably complete recovery of carbon dioxide and water from the cooled gas stream while preventing atmospheric release of carbon dioxide. Furthermore, the carbon capture unit 150 contributes to the carbon negative operation of the system 100 by capturing carbon dioxide that would otherwise be released as emissions.

In an embodiment, the carbon capture unit 150 is configured to separate the second carbon dioxide gas by multistage compression and cooling. The carbon capture unit 150 employs multiple compression stages that progressively increase the pressure of the gas stream containing the second carbon dioxide gas to facilitate separation. This multi-stage compression and cooling process enables high purity carbon dioxide separation without requiring chemical solvents or complex separation equipment. The multi-stage approach improves the separation process by operating each stage at conditions that enhances separation efficiency while reducing energy consumption. The carbon capture unit 150 configuration with multi-stage compression and cooling provides reliable and efficient carbon dioxide separation for subsequent utilization or storage.

As illustrated in FIG. 7, the carbon capture unit 150 includes multiple compressors 702 that progressively increase the pressure of the cooled gas stream to facilitate carbon dioxide separation. The carbon capture unit 150 also incorporates multiple coolers 704 that reduce the temperature of the gas stream between compression stages to enhance separation efficiency. The carbon capture unit 150 further includes multiple moisture separators 706 that remove water vapors from the gas stream through condensation processes. The carbon capture unit 150 produces high purity carbon dioxide that can be captured and utilized for various applications within the system 100.

The water vapors separated by the carbon capture unit 150 are recovered as liquid water through condensation processes that convert the vapors back to liquid form. The separation of water vapors enables recovery of water that can be reused within the system 100 for steam generation and other processes. The recovered water from the water vapor separation contributes to a closed loop operation of the system 100 by eliminating the need for external water inputs, except for the electrolyser unit 160, which may need fresh water supply. For example, the recovered wafer from the moisture separators 706 can be sent to the steam Rankine cycle unit 140 as "Makeup Water" which will be sent to the turbine 608 to produce a "Steam for Gasification and Tar Cracking" that is sent to the steam gasification unit 110. The separated water vapors provide a renewable water source that supports the sustainable operation of the system 100.

Figure 8:
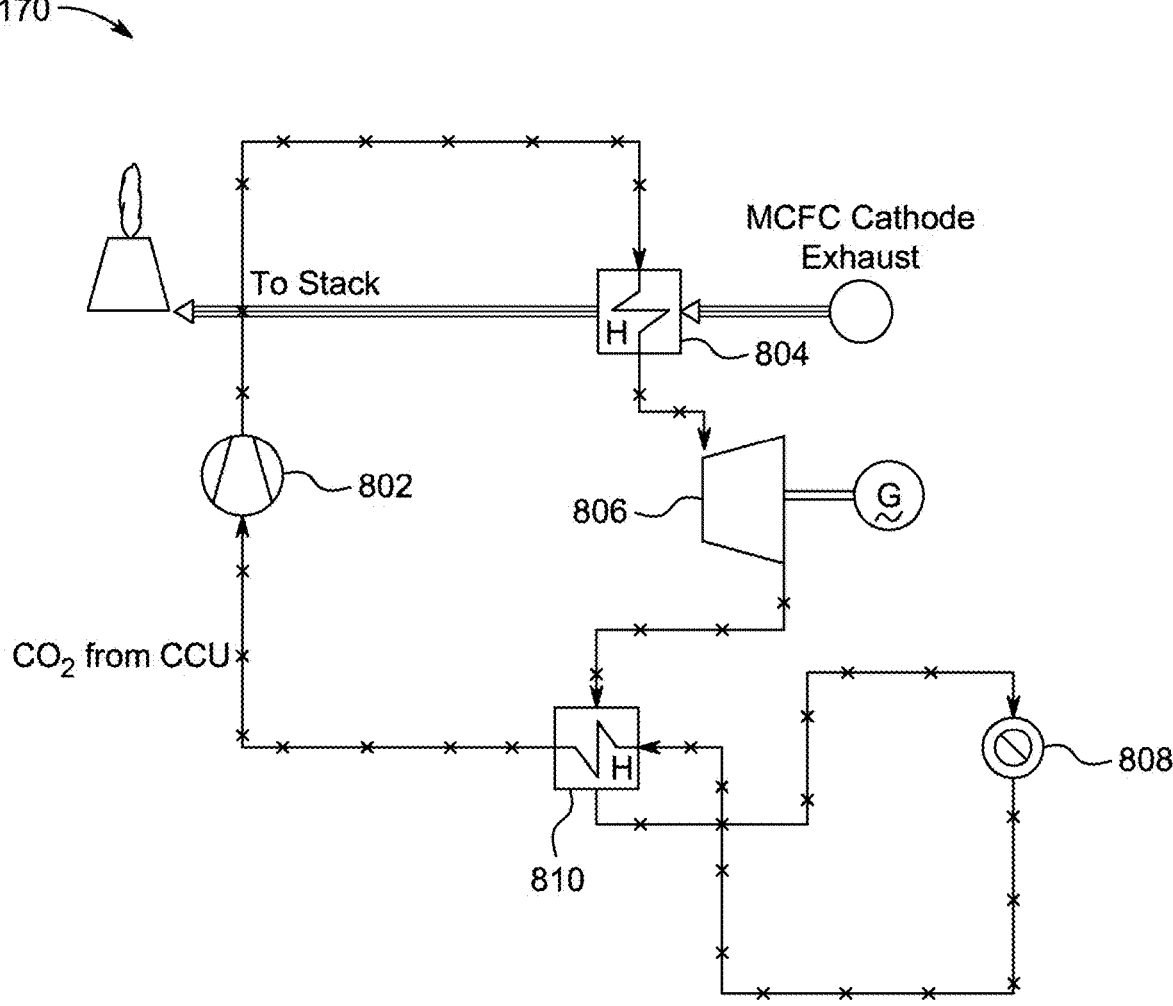
FIG. 8 is a detailed schematic diagram of a supercritical carbon dioxide unit of the system of FIG. 1, according to certain embodiments.

Further as discussed, in some examples, the system 100 includes the supercritical carbon dioxide unit 170 (as illustrated in detail in FIG. 8). The supercritical carbon dioxide unit 170 is configured to receive the second carbon dioxide gas to form a working fluid to capture a second thermal energy from the cathode of the MCFC unit 120. The supercritical carbon dioxide unit 170 utilizes the carbon dioxide captured from both the MCFC unit 120 and the carbon capture unit 150 as a working fluid for additional thermal energy recovery.

The supercritical carbon dioxide unit 170 receives the first carbon dioxide gas separated from the industrial exhaust gas by the MCFC unit 120 and the second carbon dioxide gas separated from the cooled gas stream by the carbon capture unit 150. The first carbon dioxide gas and the second carbon dioxide gas can be the same. The supercritical carbon dioxide unit 170 forms a working fluid at supercritical conditions. The supercritical carbon dioxide unit 170 captures a second thermal energy from heat sources within the system 100, particularly from the heat present in the cathode of the MCFC unit 120. Thereby, the supercritical carbon dioxide unit 170 contributes to the overall energy output of the system 100 by providing additional thermal energy recovery using captured carbon dioxide as the working fluid.

The working fluid formed by the supercritical carbon dioxide unit 170 operates at supercritical conditions that provide superior thermal energy recovery performance. The supercritical carbon dioxide working fluid exhibits enhanced heat transfer properties and thermodynamic characteristics that enable efficient thermal energy recovery from heat sources within the system 100. The supercritical carbon dioxide unit 170 operates the working fluid at pressures and temperatures above the critical point of carbon dioxide to achieve supercritical conditions. The working fluid utilization improves the energy recovery potential of the captured carbon dioxide while contributing to the overall efficiency of the system 100.

The second thermal energy captured by the supercritical carbon dioxide unit 170 from the cathode exhaust of the MCFC unit 120 provides additional energy recovery beyond the first thermal energy captured by the steam Rankine cycle unit 140. The supercritical carbon dioxide unit 170 can operate in parallel or series with other thermal energy recovery systems to improves overall energy recovery efficiency. The second thermal energy captured by the supercritical carbon dioxide unit 170 can be converted to electrical energy or utilized for other energy applications within the system 100.

In particular, as illustrated in FIG. 8, the supercritical carbon dioxide unit 170 includes a compressor 802 that pressurizes the carbon dioxide working fluid to supercritical conditions. The supercritical carbon dioxide unit 170 also incorporates a heat exchanger 804 that enables thermal energy transfer from heat sources to the supercritical carbon dioxide working fluid. The supercritical carbon dioxide unit 170 further includes a turbine 806 that expands the heated supercritical carbon dioxide to generate energy while reducing pressure and temperature. The supercritical carbon dioxide unit 170 further includes a cooler 808 that removes heat from the expanded carbon dioxide to prepare it for recompression. The supercritical carbon dioxide unit 170 further includes a recuperator 810 that enables heat exchange between high temperature and low temperature carbon dioxide streams to improve cycle efficiency.

In some embodiments, the system 100 further includes a boiler (not shown in the accompanied drawings) configured to receive the first thermal energy and the second thermal energy to generate a steam for the steam gasification unit 110. The boiler utilizes both the first thermal energy captured by the steam Rankine cycle unit 140 and the second thermal energy captured by the supercritical carbon dioxide unit 170 to generate steam required for the gasification process. The boiler receives the first thermal energy from the steam Rankine cycle unit 140 through heat transfer systems and receives the second thermal energy from the supercritical carbon dioxide unit 170 through heat exchangers. The boiler integration with both thermal energy recovery systems improves the utilization of recovered thermal energy and eliminates the need for external steam generation systems.

The system 100 may be configured to operate with one or more closed aqueous loops. In an aspect of the present disclosure, as illustrated in FIG. 1, the system 100 includes a first closed aqueous loop in which no external water is used other than internal water generated within the first closed aqueous loop, and the first closed aqueous loop includes the steam gasification unit 110, the MCFC unit 120, the oxygen combustion unit 130, the steam Rankine cycle unit 140 and the carbon capture unit 150. This closed aqueous loop enables the system 100 to operate without requiring external water inputs by recycling and reusing water generated within the various processing units. The internal water generated within the closed aqueous loop originates from processes including anode reactions in the MCFC unit 120 and combustion reactions in the oxygen combustion unit 130.

In the first closed aqueous loop, water is generated at the anode 302 (also noted as "A") of the MCFC unit 120 for example by reacting $H_2$ with $CO_3^{2-}$ as well as generated in the oxygen combustion unit 130 by combustion of $H_2$. The steam Rankine cycle unit 140 is configured to receive the aforementioned heated gas stream, which contains the water vapors generated in the MCFC unit 120 and the oxygen combustion unit 130, from the oxygen combustion unit 130 to generate the cooled gas stream containing the water vapors. The carbon capture unit 150 receives the cooled gas stream from the steam Rankine cycle unit 140 and separates $CO_2$ from $H_2O$. The steam Rankine cycle unit 140 receives the $H_2O$ from the carbon capture unit 150 to produce a steam, and the steam gasification unit 110 is configured to receive the steam from the steam Rankine cycle unit 140 to produce the syngas which is sent to the MCFC unit 120, thus completing the first closed aqueous loop. The steam is partially or wholly consumed by the steam gasification unit in steam gasification reactions. There may or may not be residual steam in the syngas. The first closed aqueous loop is self-sufficient in terms of water supply and eliminates the need for external water input.

More specifically, the moisture separators 706 of the carbon capture unit 150 separate $CO_2$ from $H_2O$, which is then sent to the steam Rankine cycle unit 140. The "Makeup Water" in FIG. 6 can be used to compensate for an outgoing steam from the steam Rankine cycle 140 to the steam gasification unit 110 and include the $H_2O$. The working fluid of the steam Rankine cycle, which includes the Makeup Water, can be heated by one or more heat exchangers (such as the superheater 606 configured to receive the heated gas stream noted as "Oxy-combustion Exhaust" for heat exchange) to produce heated water vapors. The turbine 608 is configured to receive the heated water vapors from the superheater 606 to generate energy and produce the steam that is sent to the steam gasification unit 110. That is, the turbine 608 receives the heated water vapors and expands these vapors to generate mechanical energy while producing steam as the expanded vapor output. The steam produced by the turbine 608 provides the steam required for the steam gasification unit 110.

Referring now to FIGS. 9A and 9B, illustrated is another embodiment for the system 100 in which the MCFC unit 120 and the oxygen combustion unit 130 form one integral structure (as represented by reference numeral 900). FIG. 9B is a cross-sectional view of FIG. 9A taken along the line cut AA'. The integral structure 900 includes the anode 302, the cathode 304, an electrolyte chamber 902 and a combustion chamber 904. In this embodiment, the electrolyte chamber 902 and the combustion chamber 904 share a common wall structure 906 that physically separates the electrolyte chamber 902 from the combustion chamber 904. The integral structure 900 combines the MCFC unit 120 and the oxygen combustion unit 130 into a single physical unit that enables efficient heat integration and compact design. The common wall structure 906 serves as both a physical barrier and as a heat transfer surface.

As part of the integral structure 900, an outlet of the anode 302 is connected to a first inlet 908 of the combustion chamber 904. The first inlet 908 of the combustion chamber 904 is configured to receive the remaining portion of the syngas from the anode 302 and combust the remaining portion of the syngas in the combustion chamber 904. The direct connection between the anode outlet and the first inlet 908 eliminates intermediate piping and reduces heat losses while maintaining process efficiency.

Furthermore, the common wall structure 906 is configured for heat exchange between the electrolyte chamber 902 and the combustion chamber 904. The common wall structure 906 enables thermal energy transfer from the high-temperature combustion process in the combustion chamber 904 to the electrolyte chamber 902 to maintain fuel cell operating temperatures. This heat exchange capability of the common wall structure 906 can be used in place of or in conjunction with external heating systems to maintain the molten carbonate electrolyte at required temperatures. The thermal integration enabled by the common wall structure 906 reduces energy requirements and improves the overall efficiency of the system 100.

To provide automated control, in this embodiment of FIGS. 9A and 9B, the combustion chamber 904 further includes a second inlet 910 configured to receive the oxygen gas from the electrolysis unit 160 and a gas valve 912 configured to adjust a flow rate of the oxygen gas. The electrolyte chamber 902 further includes a temperature sensor 914 configured to adjust the gas valve 912 based on a temperature of the electrolyte chamber 902. That is, the temperature sensor 914 monitors the electrolyte chamber 902 temperature continuously and generates control signals to adjust the gas valve 912 as needed to adjust the oxygen flow rate and thus the amount of heat generated by combustion and target temperatures. This integration provides automated thermal management that improves both fuel cell performance and combustion efficiency.

As shown in the cross-sectional view of FIG. 9B, the electrolyte chamber 902 is surrounded by the combustion chamber 904 by 360 degrees. The combustion chamber 904 forms a continuous annular space around the electrolyte chamber 902 to provide uniform heat transfer through the common wall structure 906. This 360-degree configuration increases the heat transfer surface area and ensures even temperature distribution, which prevents thermal gradients that could affect fuel cell performance. While shown to both be rectangular in the example of FIG. 9B, the electrolyte chamber 902 and combustion chamber 904 can have any shapes without limitations. For example, the electrolyte chamber 902 and combustion chamber 904 can both be cylindrical and have circular cross-sectional shapes. Additionally, the electrolyte chamber 902 is positioned between the anode 302 and the cathode 304 to facilitate the electrochemical reactions of the fuel cell.

Referring now to FIG. 10, illustrated is a flowchart of a method (as represented by reference numeral 1000) of waste management. The method 1000 provides a systematic approach for processing waste materials and industrial exhaust gas to generate energy and fuel while achieving carbon negative operations. The method 1000 processes these inputs through the integrated system 100 to produce multiple products.

The method 1000 includes inputting the municipal solid waste, the Palm waste and the industrial exhaust gas into the system 100. In particular, the method 1000 involves inputting the municipal solid waste and the Palm waste into the steam gasification unit 110 for conversion to the syngas. The steam gasification unit 110 processes these waste materials under high temperature steam conditions to convert the organic components into gaseous products. The gasification process eliminates the waste materials and converts them into useful syngas that can be utilized for energy generation. Further, the method 1000 involves inputting the industrial exhaust gas including carbon dioxide into the cathode 304 of the MCFC unit 120 for carbon dioxide separation and electrical energy generation. The industrial exhaust gas is directed to the cathode 304 of the MCFC unit 120 where carbon dioxide separation occurs through electrochemical processes. The processing of industrial exhaust gas enables the system 100 to provide environmental benefits beyond waste processing by reducing carbon dioxide emissions from external sources.

In the method 1000, the inputting generates the electrical energy. The inputting of municipal solid waste, Palm waste, and industrial exhaust gas initiates the integrated processes that result in electrical energy generation through multiple pathways. The electrical energy generation occurs primarily through the MCFC unit 120. Additional electrical energy generation occurs through the steam Rankine cycle unit 140 and, when present, the supercritical carbon dioxide unit 170. The electrical energy generated by the method 1000 can be utilized for electrolysis operations within the system 100 or supplied to external loads.

The system of waste management 100 of the present disclosure provides a platform that integrates multiple distinct processes into a single, cohesive operation. The system 100 utilizes a molten carbonate fuel cell unit not only for electrical energy generation but also for active separation of carbon dioxide from an external gas stream. This dual functionality is combined with an electrolysis unit that produces both a second hydrogen gas to supplement the fuel stream and an oxygen gas for use in an oxygen combustion unit. This configuration facilitates the production of a heated gas stream from unutilized syngas that is free of nitrogen, which simplifies subsequent separation of a second carbon dioxide gas.

The configuration of the present system 100 provides several functional improvements over conventional systems of waste management. By implementing one or more closed aqueous loops, the system 100 is configured to use only internal water generated within the system, which reduces the requirement for external water resources. The use of an oxygen combustion unit eliminates the need for a separate air separation unit to produce oxygen. The integration of a steam Rankine cycle unit and a supercritical carbon dioxide unit allows for the capture of thermal energy from multiple points in the process, which increases the overall energy output of the present system 100.

Numerous modifications and variations of the present disclosure are possible in light of the above teachings. It is therefore to be understood that within the scope of the appended claims, the invention may be practiced otherwise than as specifically described herein.

The invention claimed is:

1. A system of waste management, comprising:
   a steam gasification unit configured to convert municipal solid waste and Palm waste to a syngas comprising a first hydrogen gas;
   a molten carbonate fuel cell (MCFC) unit comprising an anode configured to receive the syngas from the steam gasification unit and a cathode configured to receive an industrial exhaust gas comprising a first carbon dioxide gas such that the MCFC unit generates an electrical energy and separates at least a portion of the first carbon dioxide gas from the industrial exhaust gas;
   an oxygen combustion unit configured to receive a remaining portion of the syngas from the anode of the MCFC unit and combust the remaining portion of the syngas to generate a heated gas stream comprising water vapors and a second carbon dioxide gas;
   a steam Rankine cycle unit configured to receive the heated gas stream from the oxygen combustion unit and capture a first thermal energy from the heated gas stream to generate a cooled gas stream;
   a carbon capture unit configured to separate the water vapors and separate the second carbon dioxide gas from the cooled gas stream; and
   an electrolysis unit configured to split water into an oxygen gas and a second hydrogen gas using the electrical energy from the MCFC unit,
   wherein the oxygen combustion unit is configured to receive the oxygen gas from the electrolysis unit, and the anode of the MCFC unit is configured to receive the second hydrogen gas from the electrolysis unit.

2. The system of claim 1, wherein:
   the system includes a closed aqueous loop in which no external water is used other than internal water generated within the closed aqueous loop, and
   the closed aqueous loop includes the steam gasification unit, the MCFC unit, the oxygen combustion unit, the steam Rankine cycle unit and the carbon capture unit.

3. The system of claim 2, wherein:
   the steam Rankine cycle unit is configured to receive the water vapors from the carbon capture unit to produce a steam, and
   the steam gasification unit is configured to receive the steam from the steam Rankine cycle unit to produce the syngas.

4. The system of claim 3, wherein the steam Rankine cycle unit comprises:
   one or more heat exchangers configured to receive the water vapors from the carbon capture unit and receive the heated gas stream for heat exchange to produce heated water vapors; and
   a turbine configured to receive the heated water vapors to generate energy and produce the steam.

5. The system of claim 2, wherein:
   $H_2O$ is generated by the MCFC unit and the oxygen combustion unit in the closed aqueous loop.

6. The system of claim 2, wherein:
   $H_2O$ is consumed by the steam gasification unit.

7. The system of claim 1, wherein:

the system is configured to receive no external water and use only internal water generated within the system.

8. The system of claim 1, wherein:

the MCFC unit and the oxygen combustion unit form one integral structure that comprises the anode, the cathode, an electrolyte chamber and a combustion chamber, and the electrolyte chamber and the combustion chamber share a common wall structure that physically separates the electrolyte chamber from the combustion chamber.

9. The system of claim 8, wherein:

an outlet of the anode is connected to a first inlet of the combustion chamber, and the first inlet of the combustion chamber is configured to receive the remaining portion of the syngas from the anode and combust the remaining portion of the syngas in the combustion chamber.

10. The system of claim 9, wherein:

the common wall structure is configured for heat exchange between the electrolyte chamber and the combustion chamber.

11. The system of claim 10, wherein:

the combustion chamber further comprises a second inlet configured to receive the oxygen gas from the electrolysis unit and a gas valve configured to adjust a flow rate of the oxygen gas, and the electrolyte chamber further comprises a temperature sensor configured to adjust the gas valve based on a temperature of the electrolyte chamber.

12. The system of claim 8, wherein:

the electrolyte chamber is surrounded by the combustion chamber by 360 degrees.

13. The system of claim 8, wherein:

the electrolyte chamber is positioned between the anode and the cathode.

14. The system of claim 1, further comprising:

a supercritical carbon dioxide unit configured to receive the second carbon dioxide gas to form a working fluid to capture a second thermal energy from the cathode of the MCFC unit.

15. The system of claim 14, further comprising:

a boiler configured to receive the first thermal energy and the second thermal energy to generate a steam for the steam gasification unit.

16. The system of claim 1, wherein:

the carbon capture unit is configured to separate the second carbon dioxide gas by multi-stage compression and cooling.

17. The system of claim 1, wherein:

the syngas further comprises carbon monoxide, methane and carbon dioxide.

18. The system of claim 1, wherein:

the syngas comprises no nitrogen gas.

19. A method of waste management, comprising:

inputting the municipal solid waste, the Palm waste and the industrial exhaust gas into the system of claim 1.

20. The method of claim 19, wherein:

the inputting generates the electrical energy.

* * * * *